S. F. DOUGLASS.
VEHICLE SIGNAL.
APPLICATION FILED FEB. 13, 1914.
1,209,270.
Patented Dec. 19, 1916.
3 SHEETS—SHEET 1.
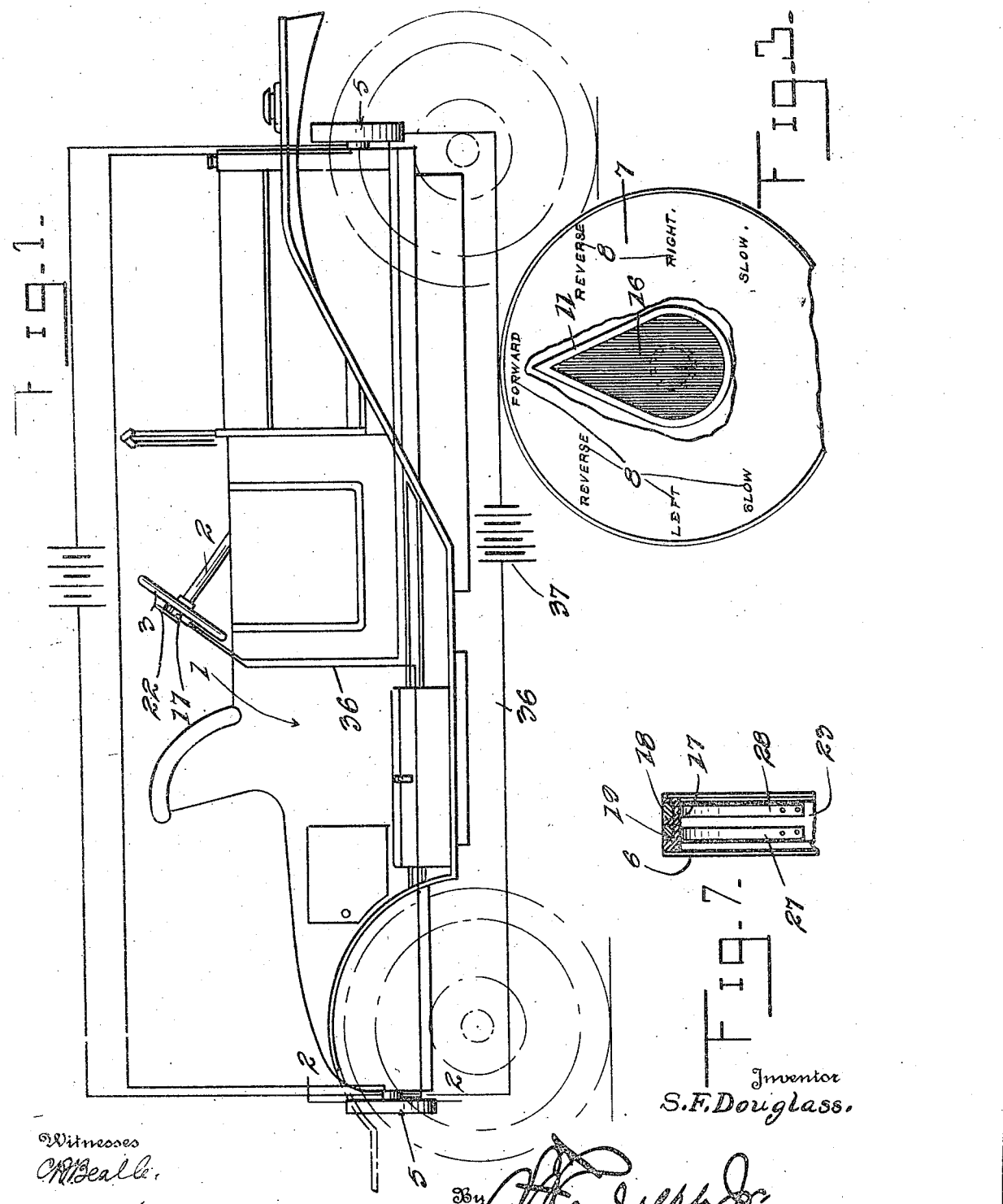
Witnesses
C. M. Beall
F. Kay Martin
Inventor
S. F. Douglass.
By
Attorney

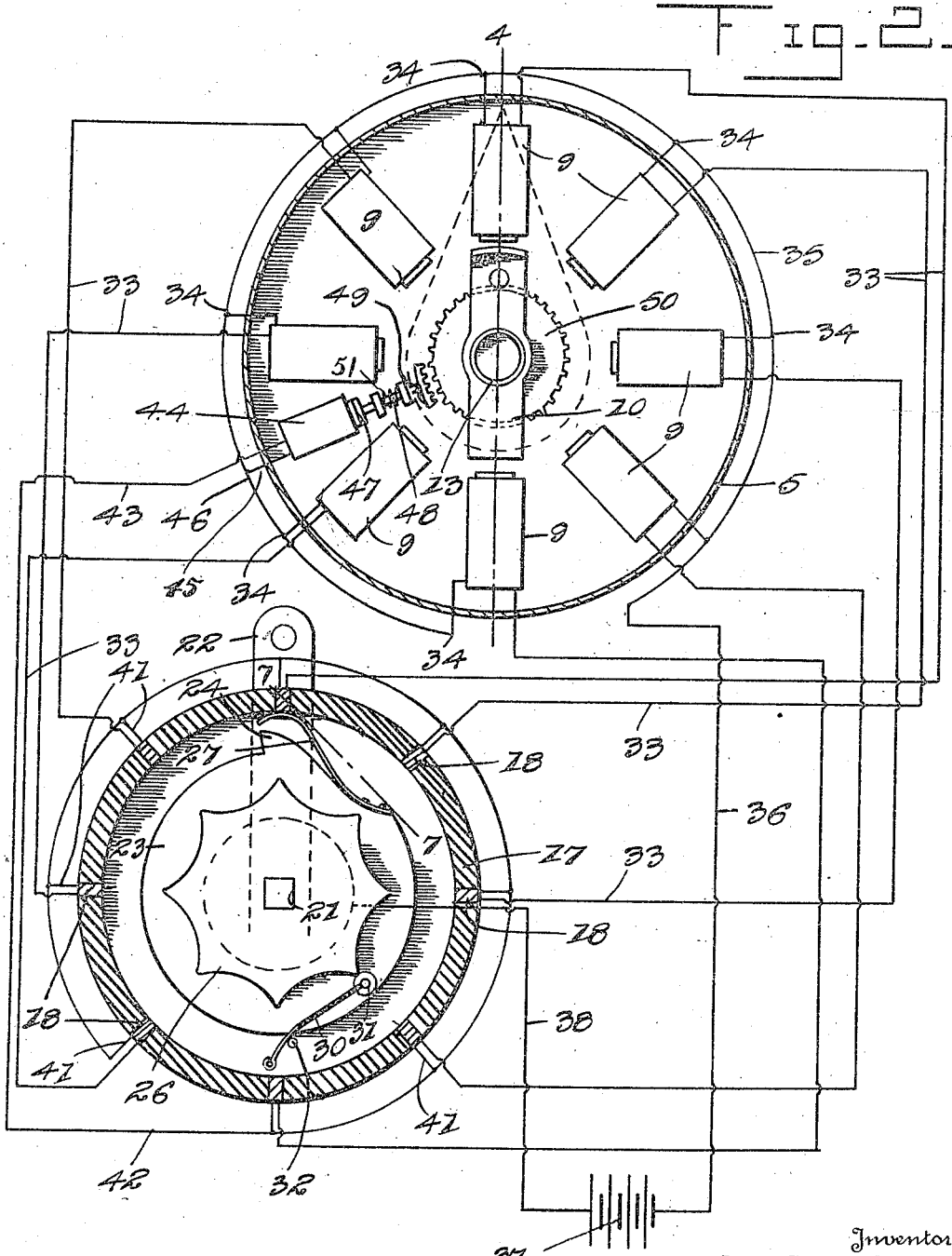

S. F. DOUGLASS.
VEHICLE SIGNAL.
APPLICATION FILED FEB. 13, 1914.
1,209,270.
Patented Dec. 19, 1916.
3 SHEETS—SHEET 3.
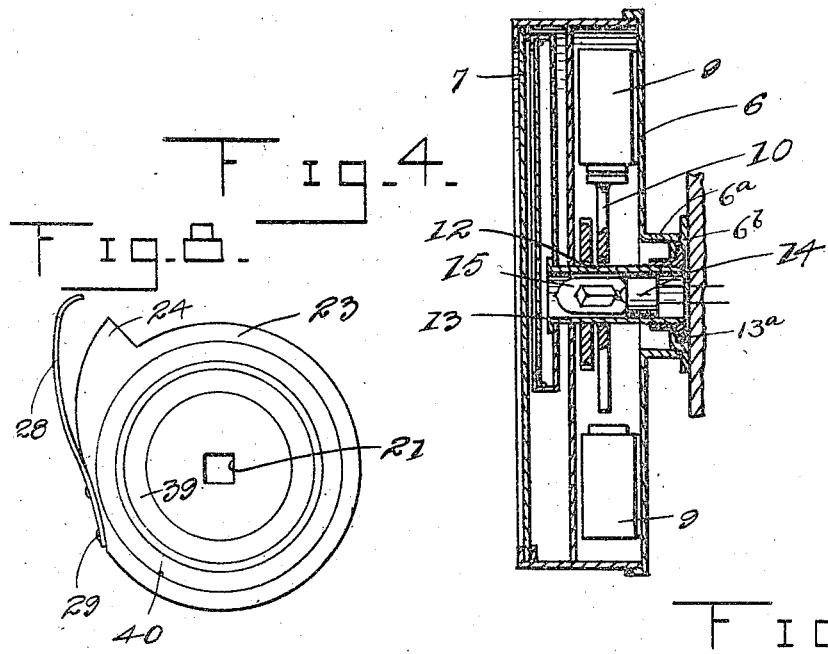
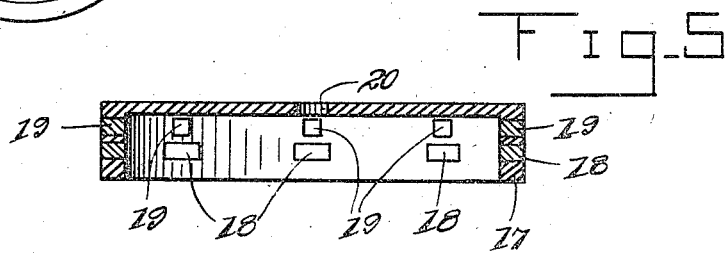
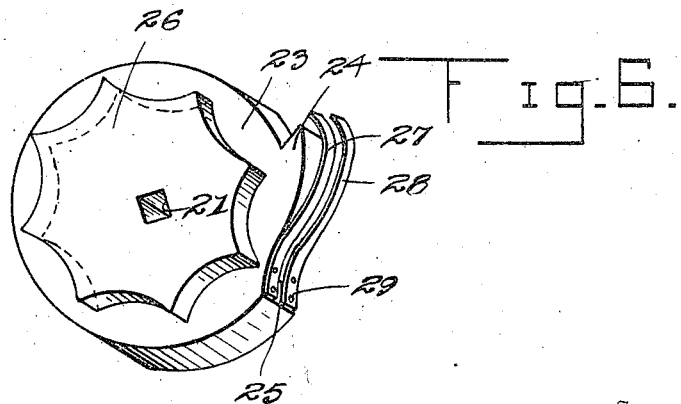
Inventor
S. F. Douglass.
Witnesses

UNITED STATES PATENT OFFICE.

SAMUEL F. DOUGLASS, OF PRAIRIE DU ROCHER, ILLINOIS, ASSIGNOR TO VEHICLE SIGNAL COMPANY, A CORPORATION OF ARIZONA.

VEHICLE-SIGNAL.

1,209,270.  Specification of Letters Patent.  Patented Dec. 19, 1916.

Application filed February 13, 1914. Serial No. 818,531.

*To all whom it may concern:*

Be it known that I, SAMUEL F. DOUGLASS, a citizen of the United States, residing at Prairie du Rocher, in the county of Randolph and State of Illinois, have invented certain new and useful Improvements in Vehicle-Signals; and I do hereby declare the following to be a full, clear, and exact description of the invention, such as will enable others skilled in the art to which it appertains to make and use the same.

This invention relates to motor vehicle signals, and one of the principal objects of the invention is to provide reliable and efficient means to be displayed at the front and rear ends of a motor vehicle for indicating the direction the vehicle is about to take in turning corners or rounding curves and to indicate to pedestrians or motorists the conditions which exist in advance of the machine and the intention of the driver as to direction to be taken.

Another object of the invention is to provide a signal or indicator at the front and rear ends of an automobile which may be illuminated at night and seen readily during the day, said indicator or signal to be operated by the driver of the machine to be turned in either direction to indicate the direction at which the driver desires to turn or to give other information to drivers of other machines and pedestrians with a view to avoiding accident to pedestrians or vehicles.

These and other objects may be attained by means of the construction illustrated in the accompanying drawings, in which:

Figure 1 is a side view in elevation of an automobile showing the indicators as they would appear when in position at each end of the car, Fig. 2 is an enlarged detail view of the interior of one of the indicators and of the interior of the controlling switch showing the method of wiring, Fig. 3 is an enlarged view of the exterior of the indicator portions being broken away to more clearly illustrate the details of construction. Fig. 4 is a vertical sectional view of the indicator taken on line 4—4 of Fig. 2, Fig. 5 is a transverse sectional view of the casing of the controlling switch showing the contacts, Fig. 6 is a detail perspective view of the rotatable element of the contact switch, Fig. 7 is a sectional view taken on line 7—7 of Fig. 2, and Fig. 8 is a detail view of the reverse side of the rotatable element illustrated in Fig. 6.

Referring now to the drawings by characters of reference, the numeral 1 designates as an entirety the body of the vehicle upon which the device is being used. This body 1 is provided with the usual steering post 2 having the steering wheel 3 at the upper end thereof.

The indicators which are used, are designated generally by the numeral 5 and are secured to each end of the vehicle as clearly shown in Fig. 1. These indicators 5, each comprise the casing 6 which is provided with a transparent front 7 having printed or otherwise indicated thereon the notations designated by the numeral 8. This casing 6 is provided with the outwardly extending hollow bar 6$^a$, which projects centrally from its rear wall and is secured to the attaching plate 6$^b$, which is secured to the vehicle. This plate is provided with an annular flange which projects inwardly and serves to hold the nipple, which will be more fully hereinafter described, rotatably in place.

The general arrangement of parts and indicators having been described it now remains to take up the description of the mechanism of the indicators in detail. The casing 6 is provided at suitable intervals therearound with the diametrically opposed electromagnets 9 which are arranged to coöperate with the armature 10 which is rotatably mounted in the center of the casing. This armature 10 is provided with the pointer 11 which is fixedly secured to the armature in such a way that when the armature turns, the pointer turns therewith. A centrally located aperture 12 is formed in the armature and is arranged to receive the nipple 13 as clearly shown in Fig. 4. This nipple 13 is provided with a suitable socket 14 in which the lamp 15 is secured. The nipple has attached to its rear end a flanged bushing 13$^a$, the flange of which is located beneath the annular flange of the plate 6$^b$, and it will thus be seen that the nipple will be free to rotate within the casing.

The pointer referred to by the numeral 11, comprises a casing having a translucent front 16 through which the light from the bulb 15 is diffused. The controlling switch referred to, preferably comprises the casing 17 of vulcanized fiber or similar nonconducting material which is provided at suitable intervals with the series of contacts 18 which are arranged to throw the magnets 9 into and out of circuit at the will of the operator. A second set of contact points 19 are arranged around the casing 17 and are so arranged as to throw the releasing magnet which will be more fully hereinafter described, into operation. A centrally located aperture 20 is formed in the casing 17 through which the operating rod 21 is adapted to extend. A suitable lever 22 is secured to the operating rod and is adapted to form a means whereby the device may be controlled by the operator.

Secured to the shaft 21 intermediate its ends is provided the rotary element which is best illustrated in Figs. 2 and 6. This rotating member comprises a disk 23 which is preferably of an insulating material and formed with a cam-like projection 24. A suitable concavity 25 is formed in the periphery of the disk adjacent to the point where the cam-like projection joins the same. Formed integral with the rotating element 23 is provided the star wheel 26, the use of which will appear hereinafter. A pair of springs 27 and 28 are secured to the rotating element as at 29 and each spring is connected to its respective circuit as will be more fully hereinafter described.

A suitable leaf spring 30 is secured to the side wall of the casing 17 in any suitable manner and has rotatably mounted at its free end the roller 31 which is arranged to engage the projections on the star wheel to hold the star wheel against accidental rotation. A pin 32 extends into the side wall of the casing and is arranged to form an abutment against which the spring 30 presses.

The contact points 18 form the terminals for the wires 33 which are connected at their opposite ends to the electromagnets 9 which are secured within the casing 6. The opposite terminals of the coils 9 are connected as at 34 to the wire 35 which is connected through the medium of the wire 36 to the battery 37. The opposite terminal of the battery 37 is connected by the wire 38 to a suitable contact ring 39 which is carried by the rotating element 23. A similar contact ring 40 is secured to the rotating element 23 and is arranged to complete the releasing solenoid circuit which will be more fully hereinafter described. The ring 39 is connected in any suitable manner to the contact spring 27 which frictionally engages the contact points 18 and thereby completes the circuit. The contact spring 28 is arranged to frictionally engage the contacts 19 and said spring is suitably connected to the ring 40 so that when the spring 28 rests on one of the contact points 19, the current will pass from the battery 37 through the wire spring 38 to the contact ring 40 from whence it passes through the spring 28 and the contact points 19, through the connecting wires 41, to the main wire 42 which is connected by the wire 43 to the brake operating solenoid 44, from whence the current returns to the battery through the wire 45 which is connected as at 46 to the wire 35, which wire is connected to the battery through the wire 36.

The brake solenoid is provided with the sliding armature 47 having secured at one end the rod 48 which is provided at its free end with a segment of a gear 49. This gear segment 49 is arranged to coöperate with the gear wheel 50 carried by the armature 10 and lock the armature against rotation when the current is not passing through the solenoid 44. A suitable spring 51 is arranged to force the segment 49 into engagement with the gear 50 so that when there is no current flowing through the solenoid 44, the spring will force the segment into engagement and thereby prevent rotation of the armature.

From the foregoing description it will be apparent that the controlling device for the indicators may be placed at any desired point on the car and for the sake of convenience it is illustrated on the steering post. When the driver desires to indicate in which direction he intends to go, it will be apparent that the only operation necessary is to adjust the handle 22 which will cause the contact springs 27 and 28 to rest on their respective contact points, thus closing the circuit through the electromagnets 9 and also through the solenoid 44 and permitting the armature to swing freely in the direction in which the circuit is flowing. As soon as the indicator has reached the desired point, it will be apparent that upon further turning of the handle 22 the contact spring 28 will pass from engagement with the contact point 19 and open the circuit, thereby permitting the toothed segment 49 to be forced into engagement with the teeth on the gear wheel 50 and hold the indicator against rotation. Upon going in any direction, it will be apparent that the same operation is gone through and the gear wheel is never at any time free to rotate except when the current is passing through one of the electromagnetic coils, thus it will be seen that any danger of confusion of signals will be avoided.

In Fig. 1 it will be noted that the wires extending across the top of the figure and battery illustrated in connection therewith are provided to furnish the lamp bulb 15 in each of the receptacles 14 with the necessary power to illuminate the indicator arrow 11.

While in the foregoing there has been shown and described the preferred embodiment of this invention, it is to be understood that such changes may be made in the combination and arrangement of parts as will fall within the spirit and scope of the invention as claimed.

Having thus described my invention, I claim:

1. In a direction indicator, an attaching plate, a stud rotatably mounted in the attaching plate, a casing attached to the attaching plate, an indicating arm at the forward end of the stud, an annularly arranged series of electromagnets within the casing, an armature carried by the stud and adapted to be attracted by the magnets, a gear wheel carried by the stud and means coöperating with the gear wheel to lock the indicating arm at various positions upon energization of the magnets.

2. A direction indicator comprising an attaching plate, a housing carried by the attaching plate, a hollow stud rotatably mounted in the attaching plate and projecting into the housing, an armature carried by the stud, an annular series of electromagnets within the casing, means to selectively energize the magnets, an indicating arm carried by the forward end of the stud, said arm being provided with a transparent front panel, means to lock the indicating arm at various adjusted positions upon the energization of the magnets and illuminating means positioned within the stud and adapted to illuminate the indicating arm.

3. A direction indicator comprising an attaching plate, a casing secured to the attaching plate, a false bottom in the casing separating the same into two separate chambers, a hollow stud rotatably mounted in the attaching plate and through an opening formed centrally in the false bottom, an annular series of independently energizable magnets arranged within the innermost chamber of the casing, an armature carried by the rotatable stud and adapted to be attracted by the magnets, electromagnetic means for locking the stud against rotation when the magnets are being energized, said means being actuated upon the energization of the magnets to release the stud, a transparent front wall for the forward end of the outer chamber, a hollow indicating arm within the outer chamber and mounted on the stud and illuminating means positioned within the hollow stud for illuminating the arm.

In testimony whereof I affix my signature.

SAMUEL F. DOUGLASS.